United States Patent
Akamine et al.

(10) Patent No.: US 9,139,448 B2
(45) Date of Patent: Sep. 22, 2015

(54) HEAT-INSULATING MATERIAL

(71) Applicant: Covalent Materials Corporation, Shinagawa-ku (JP)

(72) Inventors: Shuko Akamine, Hadano (JP); Mitsuhiro Fujita, Hadano (JP)

(73) Assignee: COVALENT MATERIALS CORPORATION, Tokyo (JP)

( * ) Notice: Subject to any disclaimer, the term of this patent is extended or adjusted under 35 U.S.C. 154(b) by 99 days.

(21) Appl. No.: 13/972,040

(22) Filed: Aug. 21, 2013

(65) Prior Publication Data

US 2014/0112861 A1    Apr. 24, 2014

(30) Foreign Application Priority Data

Oct. 22, 2012  (JP) ................... 2012-232881
Jun. 18, 2013  (JP) ................... 2013-127213

(51) Int. Cl.
C04B 38/00 (2006.01)
C01F 7/02 (2006.01)
C01F 7/16 (2006.01)
C04B 35/44 (2006.01)
C04B 35/443 (2006.01)
C04B 111/28 (2006.01)

(52) U.S. Cl.
CPC . C01F 7/02 (2013.01); C01F 7/162 (2013.01); C04B 35/44 (2013.01); C04B 35/443 (2013.01); C04B 38/0074 (2013.01); C04B 2111/28 (2013.01); C04B 2235/3262 (2013.01); C04B 2235/3272 (2013.01); C04B 2235/3279 (2013.01); C04B 2235/3284 (2013.01); C04B 2235/763 (2013.01); C04B 2235/9607 (2013.01)

(58) Field of Classification Search
None
See application file for complete search history.

(56) References Cited

U.S. PATENT DOCUMENTS 3,755,204 A * 8/1973 Sergeys ............ 502/241
4,239,656 A  12/1980 Fujitani et al.

FOREIGN PATENT DOCUMENTS

| JP | 2005-262210 A | 9/2005 |
|----|---------------|--------|
| JP | 2008-13430 A | 1/2008 |
| JP | 2011-1204 A | 1/2011 |
| JP | 2012-229139 A | 11/2012 |
| WO | WO02/081868 A1 * | 10/2002 |
| WO | WO 2004/080916 A1 | 9/2004 |

* cited by examiner

Primary Examiner — Steven Bos
(74) Attorney, Agent, or Firm — Buchanan, Ingersoll & Rooney PC

(57) ABSTRACT

A heat-insulating material is provided in which thermal conductivity is controlled not to increase and good insulation properties are held even in a high temperature range. The heat-insulating material is formed of a spinel porous sintered body having a porosity of 65 to 90 vol. % and represented by a chemical formula $XAl_2O_4$ (X=Zn, Fe, Mg, Ni, or Mn) which is arranged such that large pores having a diameter of greater than 1000 μm occupy 25 vol. % or less of the total pore volume, fine pores having a diameter of 0.45 μm or less occupy 5 to 40 vol. % of the volume of the pores having a diameter of 1000 μm or less, at least one pore-diameter distribution peak is within a range of 0.14 to 10 μm, and is formed of sintered particles having a calculated average particle diameter of 0.04 to 1 μm.

14 Claims, 6 Drawing Sheets

HEAT-INSULATING MATERIAL

BACKGROUND OF THE INVENTION

1. Field of the Invention

The present invention relates to a heat-insulating material made of a porous sintered body and having excellent in insulation properties at a high temperature of 1000° C. or more.

2. Description of the Related Art

Since a porous sintered body has a lower bulk density and lower thermal conductivity in comparison with denser ceramics, and it is widely used as heat-insulating materials.

For example, Japanese Patent Application Publication No. 2011-1204 (Patent Document 1) discloses a heat-insulating material obtained by compression molding the raw materials containing ultrafine fumed oxide as a main raw material and ceramic fine powder etc., the heat-insulating material having a particle structure such that a graph of the pore size distribution shows peaks respectively present in a pore diameter range of from 0.01 to 0.1 μm and in a pore diameter range of 10 to 1000 μm but shows no peak within a range of from 0.1 to 10 μm.

Further, Japanese Patent Application Publication No. 2012-229139 (Patent Document 2) discloses porous ceramics formed of $MgAl_2O_4$, having a porosity of 40 to 95 volume %, and having at least one pore diameter distribution peak within a range of from 10 to 365 nm.

However, the heat-insulating material described in Patent Document 1 aims at controlling shrinkage when drying after moisture absorption. Although it has heat resistance at a temperature exceeding around 500° C., particle growth of an ultrafine fumed oxide takes place in a high temperature range of 1000° C. or more, thus causing the number of pores to decrease, the porosity to be reduced, insulation properties to be degraded with changes of the pore diameter distribution, and the heat-insulating material to be deformed and shrunk.

On the other hand, the porous ceramic described in Patent Document 2 requires that at least one pore diameter distribution peak is within a range of from 10 to 365 nm, i.e. fine pores are present. However, it is not clear how many fine pores are present or how much the thermal conductivity is. Therefore, it is not sufficiently clarified how much heat insulation capability it has in which temperature range.

SUMMARY OF THE INVENTION

The present invention arises in view of the above-mentioned technical problems, and aims at providing a heat-insulating material which inhibits thermal conductivity from increasing and maintains good insulation properties even in a high temperature range of 1000° C. or more.

The heat-insulating material in accordance with the present invention is formed of a spinel porous sintered body having a porosity of from 65 vol. % to 90 vol. % and represented by a chemical formula $XAl_2O_4$, X in the above-mentioned chemical formula is either Zn, Fe, Mg, Ni, or Mn, large pores with a pore diameter of greater than 1000 μm occupy 25 vol. % or less of the total pore volume, fine pores with a pore diameter of 0.45 μm or less occupy 5 vol. % to 40 vol. % of the volume of the pores with a pore diameter of 1000 μm or less, at least one pore-diameter distribution peak is within a pore diameter range of from 0.14 μm to 10 μm, and a calculated average particle diameter of sintered particles is from 0.04 μm to 1 μm.

Such a heat-insulating material is suitable as the heat-insulating material used in a high temperature range of 1000° C. or more.

It is preferable that the above-mentioned heat-insulating material has at least one pore-diameter distribution peak within a pore-diameter range of 0.14 μm or more and less than 0.45 μm and has at least one pore-diameter distribution peak within a pore-diameter range of from 0.45 μm to 10 μm.

More preferably, the above-mentioned heat-insulating material further has at least one pore-diameter distribution peak within a pore-diameter range of from 10 μm to 1000 μm.

Further, the heat-insulating material in accordance with the present invention is formed of a porous sintered body made of $MgAl_2O_4$ and having a porosity of 73% or more, the pores having a pore-diameter of 0.8 μm or more and less than 10 μm occupy 60 vol. % or more and less than 80 vol. % of the total pore volume, the pores having a pore-diameter of 0.01 μm or more and less than 0.8 μm occupy 10 vol. % or more and less than 30 vol. % of the total pore volume, and the thermal conductivity at from 1000° C. to 1500° C. does not exceed 1.5 times the thermal conductivity at from 20° C. to 1000° C.

As for the above-mentioned heat-insulating material, the smaller the thermal conductivity in a high temperature range, the better the insulation properties that can be obtained. Thus, it is preferable that the thermal conductivity at from 1000° C. to 1500° C. is 0.3 W/m·K or less. More preferably, it is 0.26 W/m·K or less.

Further, the more the increase in the thermal conductivity in a high temperature range is controlled, the better the insulation properties that can be obtained. Thus, it is preferable that the thermal conductivity at from 1000° C. to 1500° C. does not exceed 1.2 times the thermal conductivity at from 20° C. to 1000° C.

Furthermore, it is preferable that the volumetric specific heat is 1.2 $J/cm^3 \cdot K$ or less.

As such, since the volumetric specific heat is small, it is possible to reduce the quantity of heat required to raise the temperature of the heat-insulating material, and to heat a thermal insulating space surrounded by the heat-insulating materials with less energy supply. Further, less heat storage allows the inside of the above-mentioned thermal insulating space to be cooled more quickly.

The heat-insulating material in accordance with the present invention is suitable as heat-insulating material for use in a high temperature range, since the increase in thermal conductivity is controlled and the insulation properties are maintained excellent even in a high temperature range of 1000° C. or more.

Therefore, the heat-insulating material in accordance with the present invention can suitably be applied to various structure materials or fire refractory materials (for example, furnaces for ceramics or glass, steel, non-iron, etc.) where high heat-insulation properties are required even in a high temperature environment, 1000° C. or more.

DESCRIPTION OF THE PREFERRED EMBODIMENTS

Figure 1:
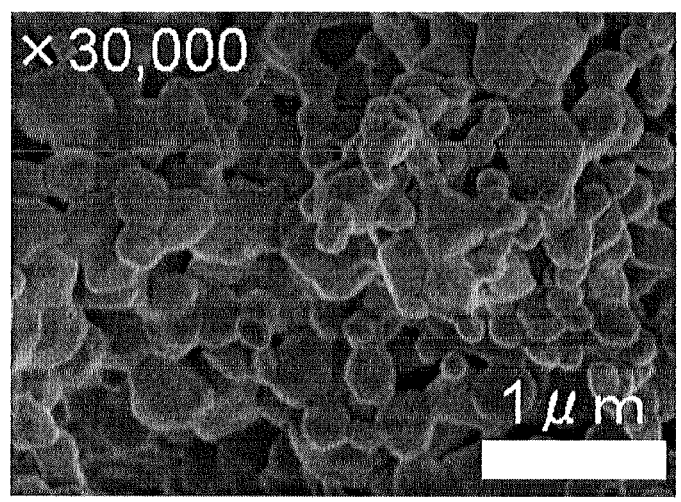
FIG. 1 is a scanning electron microscope (SEM) photograph of a section of a piece from a porous sintered body in accordance with a preferred embodiment of the present invention.

Hereinafter, the present invention will be described in detail.

A heat-insulating material in accordance with the present invention is formed of a spinel porous sintered body having a porosity of 65 vol. % to 90 vol. % (inclusive) and represented by a chemical formula $XAl_2O_4$, wherein X in the above-mentioned chemical formula is selected from the group consisting of Zn, Fe, Mg, Ni, and Mn, large pores with a pore diameter of greater than 1000 μm occupy 25 vol. % or less of the total pore volume, fine pores with a pore diameter of 0.45 μm or less occupy 5 vol. % to 40 vol. % (inclusive) of the volume of the pores with a pore diameter of 1000 μm or less, at least one pore-diameter distribution peak is within a pore diameter range of 0.14 μm to 10 μm (inclusive), and a calculated average particle diameter is from 0.04 μm to 1 μm (inclusive).

As described above, the porosity of the heat-insulating material in accordance with the present invention is from 65 vol. % to 90 vol. % (inclusive).

In the case of the heat-insulating material with a porosity of less than 65 vol. %, a rate at which the base material occupies the porous sintered body is high, and its solid heat transfer increases, thus being insufficient to obtain low thermal conductivity. The higher the porosity, the less influence of the solid heat transfer, thus decreasing the thermal conductivity. However, when the above-mentioned porosity exceeds 90%, the rate at which the base material occupies the porous sintered body decreases relatively and it becomes vulnerable, so that it may not be used as the heat-insulating material.

It should be noted that the above-mentioned porosity is calculated by JIS R 2614 "Testing method for specific gravity and true porosity of insulating fire bricks."

The above-mentioned spinel porous sintered body is of a chemical composition represented by a chemical formula $XAl_2O_4$ (where X is selected from the group consisting of Mg, Mn, Fe, Ni, and Zn). In other words, it is selected from the group consisting of $MgAl_2O_4$, $MnAl_2O_4$, $FeAl_2O_4$, $NiAl_2O_4$, and $ZnAl_2O_4$. Unless it spoils a specific structure of the porous sintered body in accordance with the present invention, it may be one of them or a plurality of them may be mixed. Of the above-mentioned chemical formulae, $MgAl_2O_4$ (i.e., magnesia spinel) is particularly preferable, because it is robust at a high temperature.

Since such a spinel porous sintered body has high heat resistance and is robust at a high temperature, it is possible to reduce the influence of changes of a shape and size of the pores, caused by particle growth or combination of particle boundaries, and to maintain temperature dependency control effects of the thermal conductivity for a long period of time.

Accordingly, it has high structural stability in a range of high temperatures (1000° C. or more, particularly 1300° C. or more) and has an isotropic crystal structure, thus being suitable as the heat-insulating material at high temperatures, since it does not to cause unique contraction even in the case of being exposed to a high temperature.

It should be noted that the above-mentioned chemical formula and spinel structure can be measured and identified by a powder X-ray diffracting method, for example.

As for the pores of the above-mentioned porous sintered body, the large pores with a pore diameter of greater than 1000 μm occupy 25 vol. % or less of the total pore volume, and the fine pores with a pore diameter of 0.45 μM or less occupy 5 vol. % to 40 vol. % (inclusive) of the volume of the pores with a pore diameter of 1000 μm or less.

When the large pores having a pore diameter of greater than 1000 μm occupy 25 vol. % of the total pore volume, an increasing number of large pores which provide low dispersion effects of infrared light leads to greater influence of radiation, insufficient heat insulation effect, and considerable reduction in robustness.

Further, provision of the fine pores having a pore diameter of 0.45 μm or less can increase the number of pores per unit volume. Such increase in the number of fine pores allows greater infrared dispersion effect. This is effective in controlling radiation heat transfer which has significant influence on the thermal conductivity at high temperatures especially, and can reduce temperature dependency of the thermal conductivity.

If the rate at which the above-mentioned fine pores occupy the volume of the pores having a pore diameter of not more than 1000 μm is less than 5 vol. %, then the number of pores per unit volume is small and the infrared dispersion effect is not fully obtained. On the other hand, if the rate at which the above-mentioned fine pores occupy the volume of the pores having a pore diameter of not more than 1000 μm exceeds 40 vol. %, then it is difficult for this porous sintered body to have a porosity of 65 vol. % or more, and the effect of reducing thermal conductivity may not be obtained.

It should be noted that the volume of the pores having a pore diameter of 1000 μm or less is measured by JIS R 1655 "Test methods for pore size distribution of fine ceramics green body by mercury porosimetry". Further, a rate of the pores having a pore diameter of greater than 1000 μm is found as a value by subtracting the porosity of the pores having a pore diameter of 1000 μm or less (measured by "Test methods for pore size distribution of fine ceramics green body by mercury porosimetry") from the porosity calculated by the above-described "Testing method for specific gravity and true porosity of insulating fire bricks".

Further, the above-mentioned porous sintered body has at least one pore-diameter distribution peak within a pore-diameter range of from 0.14 μm to 10 μm (inclusive).

With such pore diameter distribution, the radiation heat transfer control effect by employing infrared dispersion can be improved and it is possible to reduce the temperature dependency of thermal conductivity.

One or a plurality of pore-diameter distribution peaks may be within the above-mentioned pore-diameter range.

Preferably, the above-mentioned porous sintered body has at least one pore-diameter distribution peak within a pore-diameter range of 0.14 μm or more and less than 0.45 μm, and has at least one pore-diameter distribution peak within a pore-diameter range of from 0.45 μm to 10 μm (inclusive).

Thereby, the porosity can be increased easily, while including the fine pores having a pore-diameter of 0.45 μm or less.

More preferably, it has a pore-diameter distribution peak within a range of 10 μm to 1000 μm.

With such pore diameter distribution, the porosity of the whole porous sintered body is raised, while maintaining the robustness, so that a more lightweight heat-insulating material with lower thermal conductivity and less contribution to solid heat transfer may be obtained.

Further, the above-mentioned porous sintered body is formed of sintered particles whose calculated average particle diameter is from 0.04 μm to 1 μm (inclusive).

Provision of such particles allows the number of particle boundaries per unit volume to be increased, to raise the particle boundaries dispersion effect of phonons and to reduce the thermal conductivity.

If the above-mentioned calculated average particle diameter is less than 0.04 μm, then particle growth takes place when it is used at a high temperature, the pores are closed, the number of the fine pores tends to decrease, leading to insufficient effects of controlling radiation heat transfer. On the other hand, if the above-mentioned calculated average particle diameter exceeds 1 μm, then combination of particle boundaries is strengthened, the influence of solid heat transfer becomes large, and the thermal conductivity becomes high.

Now, the above-mentioned calculated average particle diameter is found as follows. Firstly, microphotography is performed at an arbitrary section of the porous sintered body, and 100 particles whose major axes and minor axes can be measured are randomly sampled from the cross-sectional picture. Then, edges of these particles are marked (outlined in bold) based on the shade of the picture, and the major axes and minor axes are measured by means of the picture. Assuming that an average of the major axis and minor axis of one particle is a particle diameter of this particle, the averages of 100 particles are averaged, and the resulting average is considered to be an arithmetic average diameter.

It should be noted that the method of performing the above-mentioned microphotography is not particularly limited, but it is preferable to use a scanning electron microscope (SEM), taking into consideration the ease of analysis.

Figure 2:
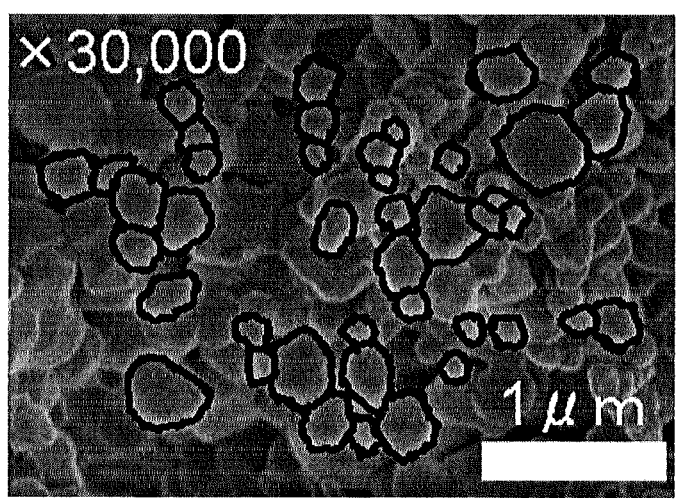
FIG. 2 is a picture where outer edges of particles of the SEM photograph of FIG. 1 are outlined in bold.

FIG. 1 shows an example of a SEM photograph, and FIG. 2 shows one in which outer edges of particles in the SEM photograph of FIG. 1 are outlined in bold by the above-described technique.

Further, according to the present invention, there is provided a heat-insulating material formed of a porous sintered body made of $MgAl_2O_4$ and having a porosity of 73% or more, wherein the pores having a pore-diameter of 0.8 μm or more and less than 10 μm occupy 60 vol. % or more and less than 80 vol. of the total pore volume, the pores having a pore-diameter of 0.01 μm or more and less than 0.8 μm occupy 10 vol. % or more and less than 30 vol. % of the total pore volume, and the thermal conductivity at from 1000° C. to 1500° C. (inclusive) does not exceed 1.5 times the thermal conductivity at from 20° C. to 1000° C. (inclusive).

A structure of such a heat-insulating material is based on our finding that specific fine pores affect the insulation properties in a high temperature range, paying attention to the pore structure of the porous sintered body. That is, this heat-insulating material increases less thermal conductivity also in the high temperature range of 1000° C. or more by controlling the quantity of the particular fine pores as described above in the above-mentioned porous sintered body, and the excellent heat insulation properties are held.

Therefore, even if the above-mentioned heat-insulating material has the same thickness, higher insulation properties can be obtained compared with the conventional heat-insulating material, and it may contribute to energy-saving effects, for example.

Further, in the case where it is applied to large-sized equipment, such as a furnace wall etc., even if it is thin, it is possible to obtain sufficient insulation properties. Thus, it is possible to save space of the equipment. As a surface area of a furnace body is reduced, the quantity of heat dissipated from a furnace body surface decreases. Further, since the above-mentioned heat-insulating material is of low heat capacity, it is possible to obtain energy-saving effect superior to that of the conventional insulating fire bricks.

The material of the above-mentioned heat-insulating material is spinel $MgAl_2O_4$.

As described above, since the spinel porous sintered body has high heat resistance and is sufficiently robust at a high temperature, it is possible to reduce changes of a shape and size of the pores, caused by particle growth at a high temperature or combination of particle boundaries, and to maintain effects of preventing the thermal conductivity from changing for a long period of time. Especially, $MgAl_2O_4$, i.e., magnesia spinel, is excellent in structural stability in a high temperature range of 1000° C. or more, and it has an isotropic crystal structure. Thus, even in the case where it is exposed to a high temperature, unique particle growth or contraction is not caused, then it is possible to maintain the pore structure which is the feature of the present invention, and is a material suitable for the heat-insulating material used at a high temperature.

Further, the porosity of the porous sintered body formed of $MgAl_2O_4$ and constituting the above-mentioned heat-insulating material is selected to be 73% or more.

If the above-mentioned porosity is less than 73%, then the rate at which the base material made of $MgAl_2O_4$ occupies the porous sintered body is high, the solid heat transfer increases, and it becomes difficult to keep the thermal conductivity low.

It should be noted that, the higher the porosity, the less influence of the solid heat transfer, thus decreasing the thermal conductivity. However, the rate at which the base material made of $MgAl_2O_4$ occupies the porous sintered body decreases relatively and it becomes vulnerable, so that it may not be used as the heat-insulating material. Thus, it is preferable that the above-mentioned porosity is less than 90%.

As for the pore structure of the above-mentioned porous sintered body, the pores having a pore diameter of 0.8 μm or more and less than 10 μm occupy 60 vol. % or more and less than 80 vol. % of the total pore volume, and the pores having a pore diameter of 0.01 μm or more and less than 0.8 μm occupy 10 vol. % or more and less than 30 vol. % of the total pore volume.

As such, most of the pores of the above-mentioned porous sintered body are small pores having a pore diameter of less than 10 μm. In the case where there are many pores having a pore diameter of 10 μm or more, the infrared dispersion effect may be reduced, the influence of radiation may be large, the heat insulation effect at a high temperature may not be obtained sufficiently, and further there is a possibility of reducing the strength of the heat-insulating material.

Preferably, it has at least one pore-diameter distribution peak within a pore-diameter range of 0.8 μm or more and less than 10 μm, and has at least one pore-diameter distribution peak within a pore-diameter range of 0.01 μm or more and less than 0.8 μm.

In particular, among the pores of the above-mentioned porous sintered body, the pores having a pore diameter of 0.01 μm or more and less than 0.8 μm occupy 10 vol. % or more and less than 30 vol. % of the total pore volume.

As the fine pores having a pore diameter of 0.01 μm or more and less than 0.8 μm exist at the above-mentioned rate, the number of pores per unit volume can be increased, and the infrared dispersion effect can be raised. It is particularly effective in controlling radiation heat transfer which has significant influence on the thermal conductivity in a high temperature range, the effect which controls the increase in the thermal conductivity in a high temperature range is obtained, to thereby obtain good insulation properties.

If the rate at which the above-mentioned fine pores occupy the total pore volume is less than 10 vol. %, then the number of pores per unit volume is small and the infrared dispersion effect is not fully obtained. On the other hand, if the rate at which the above-mentioned fine pores occupy the total pore volume is 30 vol. % or more, then there is a possibility of reducing the strength of the heat-insulating material.

It should be noted that the pore diameter distribution in the above-mentioned porous sintered body can be measured by JIS R 1655 "Test methods for pore size distribution of fine ceramics green body by mercury porosimetry".

In particular, as for the thermal conductivity of the above-mentioned heat-insulating material, the thermal conductivity at from 1000° C. to 1500° C. (inclusive) shall not exceed 1.5 times thermal conductivity at from 20° C. to 1000° C. (inclusive).

As such, also in a high temperature range of from 1000° C. to 1500° C. (inclusive), the heat-insulating material whose thermal conductivity in a high temperature range is controlled so as not to increase can hold the heat insulation effect equivalent to that in a low-temperature range of 1000° C. or less, and can be employed suitably in the high temperature range.

It should be noted that it is possible to have a pore-diameter distribution peak within a pore-diameter range of 10 μm or more, but the large pores may reduce the insulation properties due to radiation heat transfer, and it is not preferable that there are pores having a pore diameter of greater than 1000 μm.

With such pore diameter distribution, the porosity of the whole porous sintered body is raised, while maintaining the robustness, so that a more lightweight heat-insulating material with lower thermal conductivity and less contribution to solid heat transfer may be obtained.

Further, as for the above-mentioned heat-insulating material, it is preferable that the volumetric specific heat at from 20° C. to 1500° C. (inclusive) is 1.2 J/cm$^3$·K or less.

Since the volumetric specific heat is 1.2 J/cm$^3$·K or less, it is possible to reduce the quantity of heat required to raise the temperature of the heat-insulating material. For example, it is possible to heat a thermal insulating space, such as a furnace, surrounded by the heat-insulating materials with less energy supply. Further, small volumetric specific heat means that an amount of thermal storage is small. Thus, it is possible to cool the inside of the furnace more quickly to take out a heat treatment object in the furnace. Furthermore, since heat insulating efficiency is high, it is possible to design a heat insulating object, such as a furnace, compactly.

Further, as for the above-mentioned porous sintered body, it is preferable that primary particles having a particle diameter larger than 100 μm are not observed in arbitrary sections. More preferably, there are no primary particles having a particle diameter larger than 50 μm.

As such, by controlling growth of crystal grains, the fine pores can be maintained and high temperature insulation properties can be held.

The thus described method of manufacturing the heat-insulating material in accordance with the present invention is not particularly limited, but a conventional method of manufacturing the porous sintered body may be employed. For example, formation and adjustment of a pore structure may be carried out by addition of a pore forming material, a foaming agent, etc.

It should be noted that the heat-insulating material in accordance with the present invention may also constitute a composite material by providing coating layers, such as a fireproof material, on its the surface, or using it as a joint material etc.

EXAMPLES

Hereinafter, the present invention will be described in more detail with reference to Examples, however the present invention is not limited to Examples below.

Example 1

Mixing was effected at a ratio of 9 mols of magnesium oxide powder (MGO11PB; manufactured by Kojundo Chemical Laboratory Co., Ltd.) to 11 mols of hydraulic alumina powder (BK-112; manufactured by Sumitomo Chemical Co., Limited). Pure water was added to the mixture to prepare a slurry. To the resultant slurry, acrylic resin particles having a diameter of 10 μm were added as a pore forming material at a rate of 50 vol. % of the slurry, and hydraulic molding was carried out to obtain a plate-like molded body having dimensions of 75 mm×105 mm×30 mm (thick) was obtained. This molded body was fired at 1500° C. in atmosphere for 3 hours to obtain a porous sintered body.

A crystal phase of the thus obtained porous sintered-body was identified by X-ray diffraction (X radiation source: CuKα, voltage: 40 kV, current: 0.3 A, scanning-speed: 0.06°/s), and a magnesia spinel phase was observed.

Figure 3:
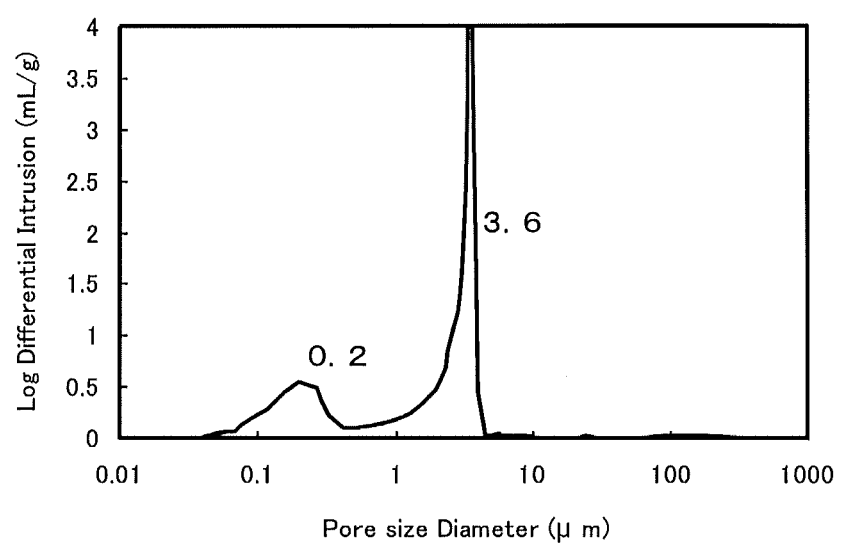
FIG. 3 is a graph showing pore diameter distribution of the porous sintered body in accordance with Example 1, measured by a mercury porosimeter.

Further, the pore diameter distribution of this porous sintered body is shown in FIG. 3. From a graph of pore diameter distribution shown in FIG. 3, peaks are respectively observed at pore diameters 0.20 μm and 3.80 μm.

As for the above-mentioned porous sintered body, various evaluation results are collectively shown in Table 1. It should be noted that as for the commercially available heat-insulating material formed of a mullite fiber structure, data of the material, main structure, and withstand temperature described in a catalogue are also listed for comparison, and other actual measurements are listed together as a conventional example.

TABLE 1

| | Main Material | Withstand Structure | Temperature (°C.) | Porosity (%) | Volume of Large Pores (vol. %) | Volume of Fine Pores (vol. %) | Pore-diameter Peak Position (μm) | Calculated Average Particle Diameter (μm) | Thermal Conductivity (W/m·K) 1300° C. | Thermal Conductivity (W/m·K) 1500° C. |
|---|---|---|---|---|---|---|---|---|---|---|
| Conventional Example | Mullite | Fiber | 1600 | 84 | 32 | 0 | 91 | — | 0.29 | 0.40 |
| Example 1 | MgAl$_2$O$_4$ | Porous Body | 1500 | 78 | <1 | 17 | 0.20 3.80 | 0.21 | 0.20 | 0.20 |

Further, based on JIS R 2251-1 "Test method for thermal conductivity of refractory materials—Part I: Hot-wire method (cross-array)", a sample having dimensions of 50 mm×70 mm×20 mm (thick) was measured at up to 1500° C. by using a platinum rhodium alloy wire (87% Pt, 13% Rh) as a heating wire and using an R thermocouple.

Figure 4:
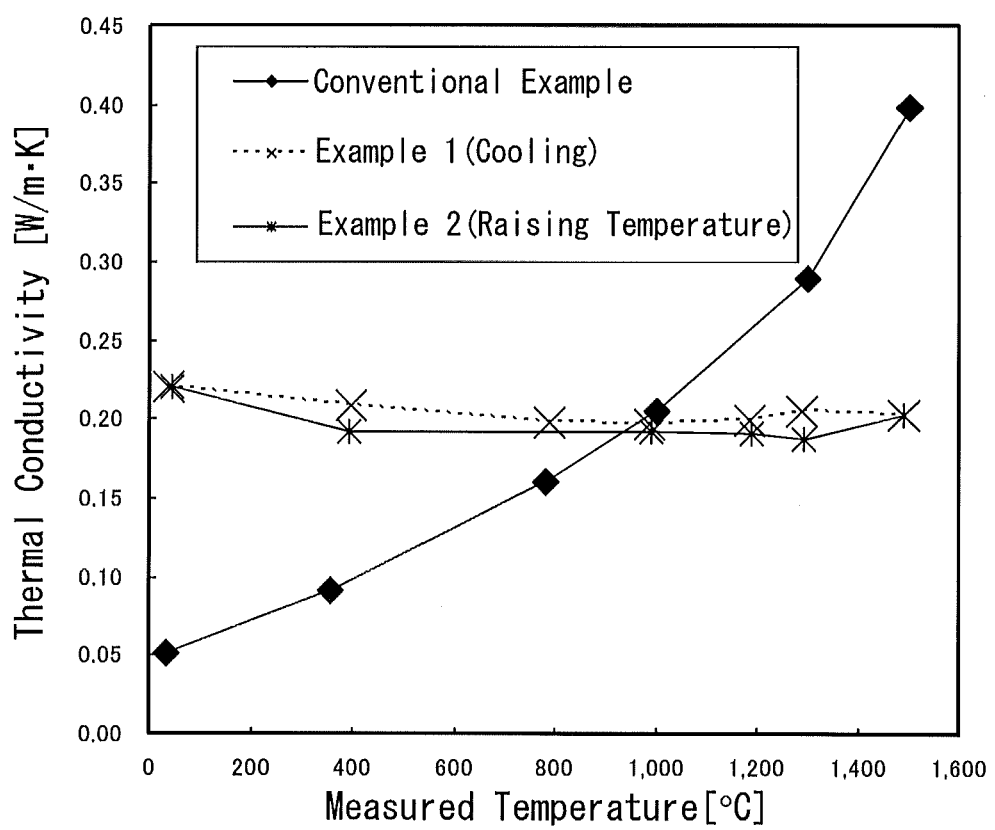
FIG. 4 is a graph showing a relationship between a temperature and thermal conductivity with respect to Example 1 and a conventional example.

FIG. 4 shows a graph of the measurement results of the thermal conductivity in Example 1 and the above-mentioned conventional example.

As can be seen from the graph shown in FIG. 4, it is observed that the radiation heat transfer of the commercially available heat-insulating material (conventional example) increases with increasing temperature and the thermal conductivity increases considerably.

On the other hand, in Example 1 the thermal conductivity is within a range of 0.19 to 0.22 W/m·K, and its temperature dependency is not observed, but it is confirmed that the thermal conductivity is also low at 1000° C. or more, especially in a high temperature range of 1300° C. or more. Further, no difference is observed between the measured thermal conductivity at the time of raising the temperature up to 1500° C. and that at the time of subsequent cooling. Thus, it is confirmed that the insulation properties do not change after being exposed to a high temperature of 1500° C.

Examples 2 to 11, Comparative Examples 1 to 8

Porous sintered bodies were prepared having respective structures as shown in the following Table 2.

The structure of each porous sintered body was adjusted by changing an average particle diameter of the hydraulic alumina powder material, the mixing ratio of magnesium oxide powder, the loading of the pore forming material, firing temperature, and firing time.

The various evaluation results of the respective porous sintered bodies are collectively shown in Table 2.

TABLE 2

| | Material | Porosity (%) | Large Pores (vol %) | Fine Pores (vol %) | Pore-diameter Peak Position (μm) | Calculated Average Particle Diameter (μm) | Thermal Conductivity (W/m·K) 1300° C. | Thermal Conductivity (W/m·K) 1500° C. |
|---|---|---|---|---|---|---|---|---|
| Conventional Example | Mullite | 84 | 32 | 0 | 91 | (Fiber) | 0.29 | 0.40 |
| Example 1 | MgAl$_2$O$_4$ | 78 | <1 | 17 | 0.20 3.8 | 0.21 | 0.20 | 0.20 |
| Example 2 | MgAl$_2$O$_4$ | 77 | 1 | 23 | 0.30 3.5 | 0.33 | 0.20 | 0.20 |
| Example 3 | MgAl$_2$O$_4$ | 65 | <1 | 39 | 0.79 | 0.11 | 0.28 | 0.28 |
| Example 4 | MgAl$_2$O$_4$ | 70 | <1 | 22 | 0.20 1.0 | 0.21 | 0.25 | 0.25 |
| Example 5 | MgAl$_2$O$_4$ | 89 | <1 | 10 | 0.20 7.2 | 0.25 | 0.13 | 0.13 |
| Example 6 | MgAl$_2$O$_4$ | 90 | 25 | 23 | 0.30 6.2 | 0.60 | 0.22 | 0.25 |
| Example 7 | MgAl$_2$O$_4$ | 83 | <1 | 5 | 0.29 8.2 | 0.31 | 0.22 | 0.27 |
| Example 8 | MgAl$_2$O$_4$ | 77 | 2 | 28 | 0.14 5.2 | 0.25 | 0.18 | 0.18 |
| Example 9 | MgAl$_2$O$_4$ | 81 | <1 | 6 | 0.2 9.8 | 0.43 | 0.22 | 0.22 |
| Example 10 | MgAl$_2$O$_4$ | 78 | 5 | 21 | 0.15 6.3 | 0.04 | 0.17 | 0.17 |
| Example 11 | MgAl$_2$O$_4$ | 77 | 3 | 11 | 0.44 3.3 | 1.0 | 0.25 | 0.25 |
| Comparative Example 1 | MgAl$_2$O$_4$ | 60 | <1 | 30 | 0.28 1.2 | 0.12 | 0.67 | 0.67 |
| Comparative Example 2 | MgAl$_2$O$_4$ | (92) | — | — | — | — | — | — |
| Comparative Example 3 | MgAl$_2$O4 | 85 | 31 | 7 | 0.19 7.3 | 0.25 | 0.37 | 0.44 |
| Comparative Example 4 | MgAl$_2$O$_4$ | 78 | 5 | 3 | 0.38 2.2 | 0.34 | 0.31 | 0.40 |
| Comparative Example 5 | MgAl$_2$O$_4$ | 63 | 4 | 45 | 0.29 0.51 | 0.29 | 0.58 | 0.58 |

TABLE 2-continued

|  | Material | Porosity (%) | Large Pores (vol %) | Fine Pores (vol %) | Pore-diameter Peak Position (μm) | Calculated Average Particle Diameter (μm) | Thermal Conductivity (W/m · K) 1300° C. | Thermal Conductivity (W/m · K) 1500° C. |
|---|---|---|---|---|---|---|---|---|
| Comparative Example 6 | MgAl$_2$O$_4$ | 77 | 3 | 22 | 0.10 | 0.03 | 0.33 | 0.41 |
| Comparative Example 7 | MgAl$_2$O$_4$ | 81 | 2 | — | 13 | 0.34 | 0.34 | 0.45 |
| Comparative Example 8 | MgAl$_2$O$_4$ | 75 | 10 | 30 | 0.39 2.0 | 1.2 | 0.35 | 0.35 |

As can be seen from the evaluation results listed in Table 2, it is confirmed that in any one of Examples 1 to 11 the thermal conductivities are respectively lower than 0.29 W/m·K and 0.40 W/m·K of the conventional example at 1300° C. and at 1500° C. and there is substantially no increase in thermal conductivity with increasing temperature.

It should be noted that the higher the porosity, the lower the thermal conductivity, but the porous sintered body (Comparative Example 2) exceeding a porosity of 90% (it was prepared, targeting a porosity of 92%) was vulnerable and it was not able to prepare one having sufficient intensity.

Further, in Example 3, the number of the pore-diameter distribution peaks within a pore-diameter range of from 0.14 μm to 10 μm (inclusive) is one, however the porosity is the lowest of these Examples and the thermal conductivity is the highest.

In the other Examples, there is one pore-diameter distribution peak either within a pore-diameter range of 0.14 μm or more and less than 0.45 μm or within a pore-diameter range of from 0.45 μm to 10 μm (inclusive), and the porosity is 70 vol. % or more, whereby the effects in the preferred embodiments of the present invention are confirmed.

Figure 5:
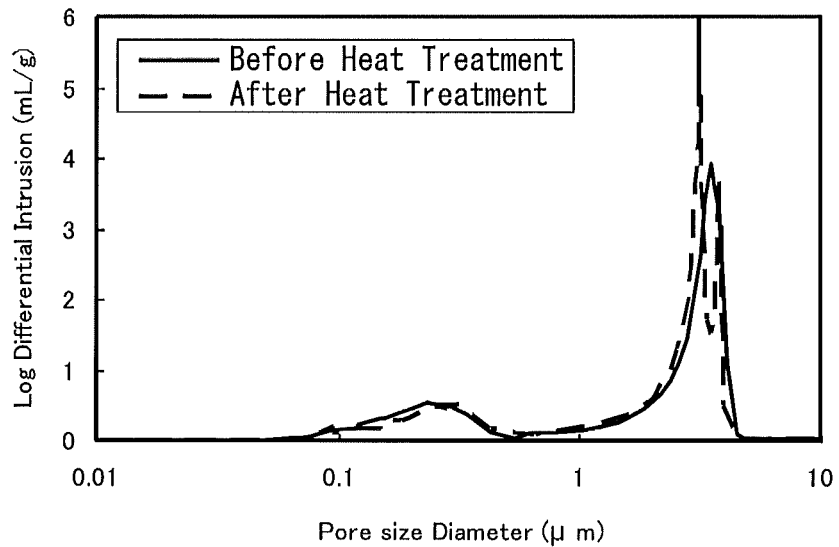
FIG. 5 is a graph showing pore diameter distributions of the porous sintered body in accordance with Example 2, before and after 24 hour heat-treatment at 1500° C. in the atmosphere.

Further, as for the porous sintered body prepared in Example 2, FIG. 5 shows a graph of the pore diameter distribution before and after performing the heat treatment in the atmosphere, at 1500° C., for 24 hours.

As shown in the graph of the pore diameter distribution of FIG. 5, since changes in pore-diameter distribution before and after the heat treatment are not observed, it is confirmed that the pore diameter does not change but is excellent in heat resistance, even if the porous sintered body in accordance with the present invention is exposed to a high temperature of 1500° C.

Example 12

By the method as in Example 1, as shown in Example 12 in the following Table 3, the porous sintered body having the pore-diameter distribution peaks within a pore-diameter range of from 0.14 μm to 10 μm (inclusive) and also within a pore-diameter range of greater than 10 μm and 1000 μm or less was prepared by suitably adjusting a diameter and loading of the pore forming material.

The various evaluation results about this porous sintered body are shown in Table 3. The evaluation results of Examples 1 and 5 are also collectively shown for comparison.

It should be noted that, as for compressive strength in Table 3, cubes with dimensions of 20 mm (one side) were produced from the respective porous sintered bodies as test samples which were evaluated by a method as in JIS R 2615 "Testing method for crushing strength of insulating fire bricks".

Figure 6:
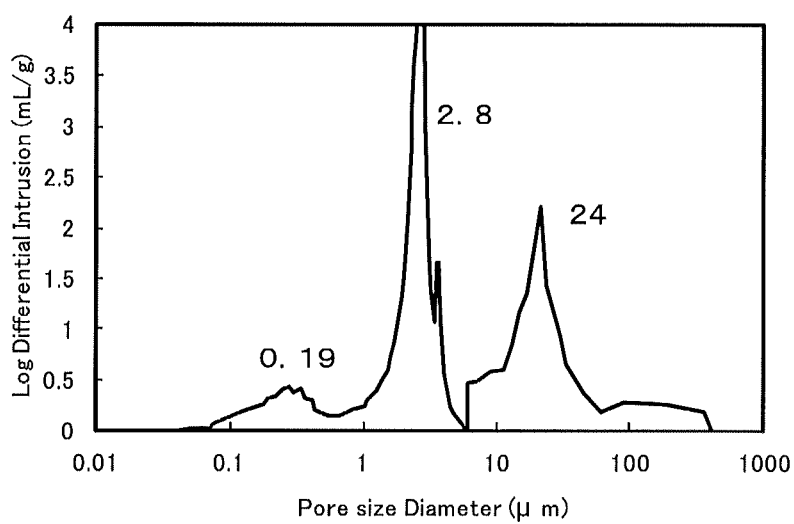
FIG. 6 is a graph showing the pore diameter distribution of the porous sintered body in accordance with Example 12, measured by the mercury porosimeter.

Further, the pore diameter distribution of this porous sintered body is shown in FIG. 6.

TABLE 3

|  | Material | Porosity (%) | Volume of Large Pores (vol. %) | Volume of Fine Pores (vol. %) | Pore-diameter Peak Position (μm) | Calculated Average Particle Diameter (μm) | Thermal Conductivity (W/m · K) 1300° C. | Thermal Conductivity (W/m · K) 1500° C. | Compressive Strength (×10$^{-2}$ MPa) |
|---|---|---|---|---|---|---|---|---|---|
| Example 1 | MgAl$_2$O$_4$ | 78 | <1 | 17 | 0.20 3.8 | 0.21 | 0.20 | 0.20 | 84 |
| Example 5 | MgAl$_2$O$_4$ | 89 | <1 | 10 | 0.20 7.2 | 0.25 | 0.13 | 0.13 | 21 |
| Example 12 | MgAl$_2$O$_4$ | 89 | <1 | 8 | 0.19 2.8 24 | 0.24 | 0.13 | 0.13 | 87 |

As can be seen from the evaluation results listed in Table 3, although the porosity and thermal conductivity in Example 12 are comparable with those in Example 5, the compressive strength is higher. This is believed to be because one having pores with a larger diameter has a larger base-material frame-section and increased strength in the case of those having comparable porosity.

Therefore, as can be seen from comparison between Example 1 and Example 12, since there is also the pore-diameter distribution peak within a pore-diameter range of greater than 10 μm and 1000 μm or less, it is possible to obtain the porous sintered body having higher porosity and lower thermal conductivity, without spoiling the compressive strength.

It should be noted that although only MgAl$_2$O$_4$ is explained in Examples above, the present invention provides similar effects by employing a spinel sintered body made of either $ZnAl_2O_4$, $FeAl_2O_4$, $NiAl_2O_4$, or $MnAl_2O_4$ as described above. These can be manufactured somewhat like $MgAl_2O_4$ as described above, except using material combinations of $ZnO+Al_2O_3$, $Fe_2O_3+Al_2O_3$, $NiO+Al_2O_3$, and $MnO+Al_2O_3$ for order.

Example 13

Mixing was effected at a ratio of 9 mols of magnesium oxide powder (MGO11PB; manufactured by Kojundo Chemical Laboratory Co., Ltd.) to 11 mols of hydraulic alumina powder (BK-112; manufactured by Sumitomo Chemical Co., Limited). To the mixture, pure water was added and a binder was added further, which were uniformly dispersed to prepare a slurry. The slurry was dried and ground, then compression molded at a pressure of 5 MPa.

The resultant molded body was dried then fired at a maximum temperature of 1550° C. for 5 hours to prepare a porous sintered body.

A crystal phase of the thus obtained porous sintered-body was identified by X-ray diffraction (X radiation source: CuKα, voltage: 40 kV, current: 0.3 A, scanning-speed: 0.06°/s), and a magnesia spinel phase was observed.

Figure 7:
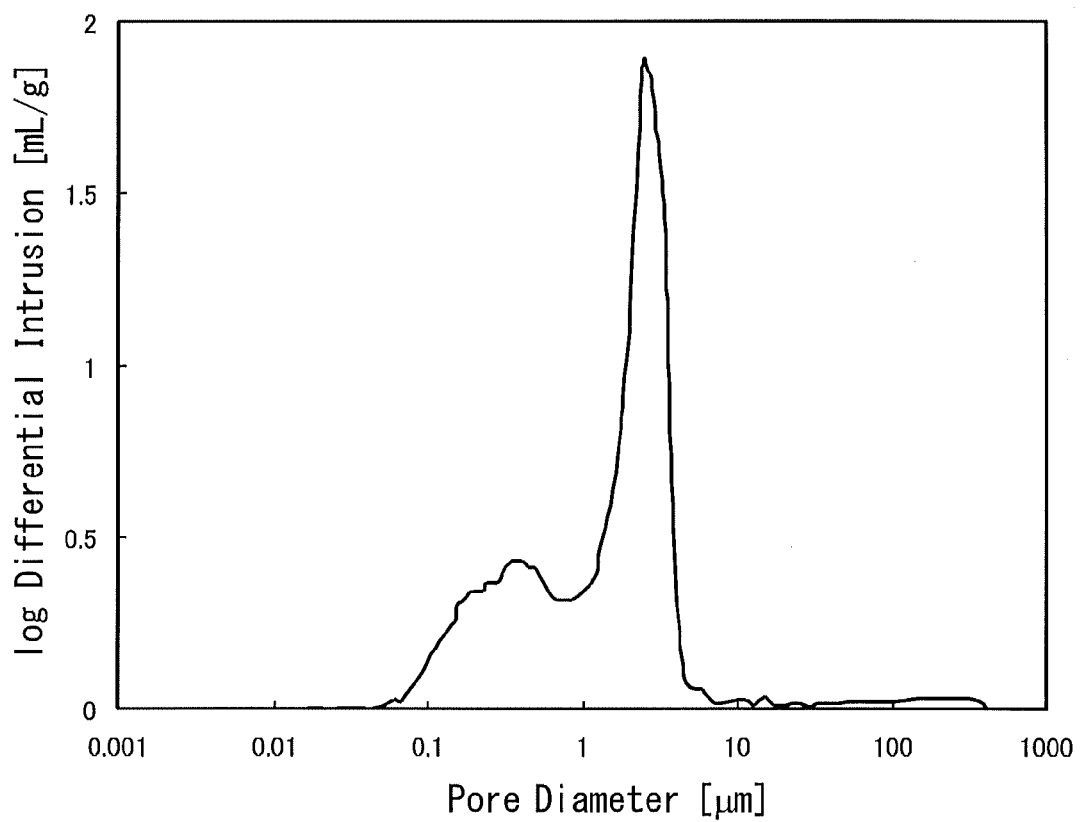
FIG. 7 is a graph showing the pore diameter distribution of the porous sintered body in accordance with Example 13, measured by the mercury porosimeter.

Further, the pore diameter distribution of this porous sintered body is shown in FIG. 7. From a graph of pore diameter distribution shown in FIG. 7, peaks are respectively observed at pore diameters of 0.37 jinn and 2.52 μm.

Furthermore, the volumetric specific heat at from 20° C. to 1500° C. (inclusive) is from 0.64 J/cm³·K to 1.08 J/cm³·K (inclusive).

Example 14

Mixing was effected at a ratio of 9 mols of magnesium oxide powder (MGO11PB; manufactured by Kojundo Chemical Laboratory Co., Ltd.) to 11 mols of hydraulic alumina powder (BK-112; manufactured by Sumitomo Chemical Co., Limited). To the mixture, pure water of 1.5 times (by weight) the total weight of hydraulic alumina and magnesium oxide was added to prepare a slurry which was molded.

The resultant molded body was dried then fired at up to 1550° C. for 5 hours to prepare a porous sintered body.

Examples 15 and 16

As with the method in Example 13 (except that the pressure, firing temperature, and firing time of Example 13 were changed suitably), the porous sintered bodies were prepared having pore structures as shown in the items of Examples 15 and 16 listed in the following Table 4, respectively.

Comparative Examples 9 and 10

These are commercially available fiberboard heat-insulating materials (mullite).

Comparative Examples 11 and 12

As with the method in Example 13 (except that the pressure, firing temperature, and firing time of Example 13 were changed suitably and that organic particles were added for adjusting pores), the porous sintered bodies were prepared having pore structures as shown in the items of Comparative Examples 11 and 12 listed in the following Table 4, respectively.

As for each of the porous sintered bodies in Examples and Comparative Example, thermal conductivity was measured on the basis of JIS R 2616 "Testing method for thermal conductivity of insulating fire bricks".

Figure 8:
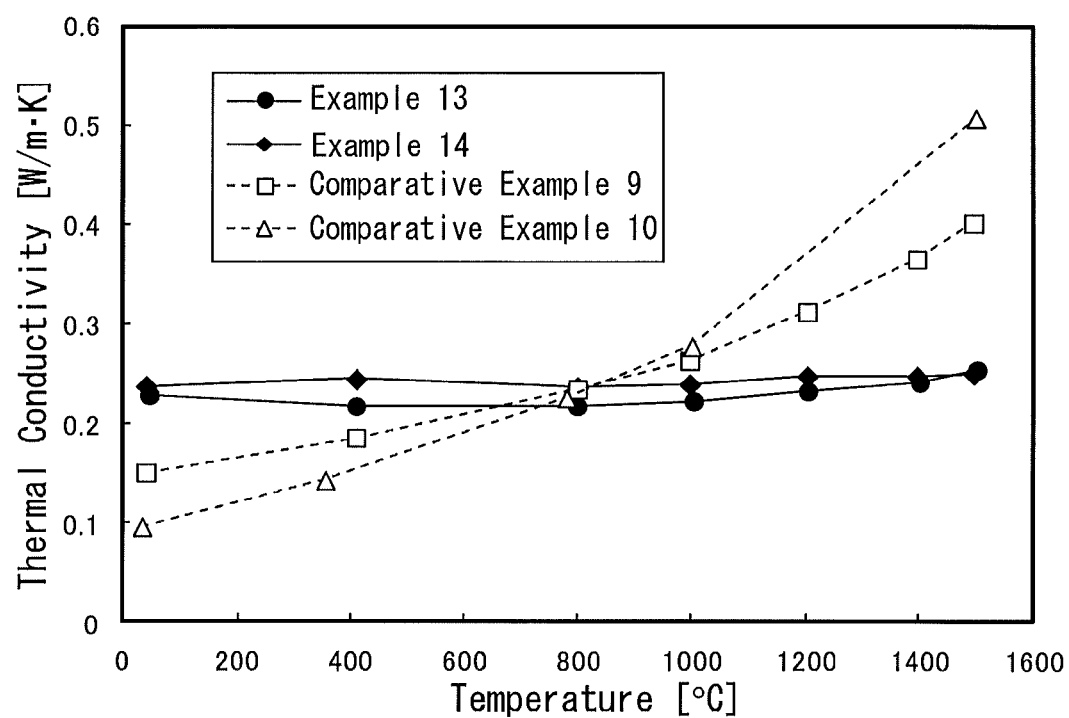
FIG. 8 is a graph showing a relationship between a temperature and thermal conductivity with respect to Examples 13, 14 and Comparative Examples 9, 10.

FIG. 8 shows a graph of the measurement results of the thermal conductivity in Examples 13 and 14 and Comparative Examples 9 and 10.

Further, the various evaluation results are collectively shown in the following Table 4.

TABLE 4

| | Porosity | Pore Volume (vol. %) | | Thermal Conductivity | | |
|---|---|---|---|---|---|---|
| | | | | 20-1000° C. Minimum Value: A | 1000-1500° C. Maximum Value: B | |
| | (%) | 0.01-0.8 μm | 0.8-10 μm | (W/m · K) | (W/m · K) | B/A |
| Example 13 | 78 | 20 | 75 | 0.22 | 0.24 | 1.09 |
| Example 14 | 78 | 24 | 72 | 0.24 | 0.25 | 1.04 |
| Example 15 | 80 | 15 | 76 | 0.20 | 0.27 | 1.35 |
| Example 16 | 77 | 27 | 68 | 0.24 | 0.28 | 1.17 |
| Comparative Example 9 | 92 | — | — | 0.15 | 0.40 | 2.67 |
| Comparative Example 10 | 84 | — | — | 0.10 | 0.51 | 5.10 |
| Comparative Example 11 | 70 | 30 | 60 | 0.36 | 0.39 | 1.08 |
| Comparative Example 12 | 85 | 7 | 90 | 0.16 | 0.51 | 3.19 |

As can be seen from the graph shown in FIG. 8, it is observed that the radiation heat transfer of the commercially available fiberboards (Comparative Examples 9 and 10) increases with increasing temperature and the thermal conductivity increases considerably.

On the other hand, in Examples 13 and 14, the thermal conductivity is within a range of 0.22 to 0.26 W/m·K, and it is confirmed that the thermal conductivity at from 1000° C. to 1500° C. (inclusive) is less than 1.2 times the thermal conductivity at from 20° C. to 1000° C. (inclusive) and that the thermal conductivity is prevented from increasing even in a high temperature range of 1000° C. or more.

Further, as can be seen from the evaluation results shown in Table 4, in each of Examples 13 to 16, the thermal conductivity is less than 0.3 W/m·K, and the thermal conductivity at from 1000° C. to 1500° C. (inclusive) is less than 1.5 times the thermal conductivity at from 20° C. to 1000° C. (inclusive). Furthermore, especially in each of Examples 13, 14, and 16 in which there are many pores having a pore diameter of 0.01 μm or more and less than 0.8 μm, the thermal conductivity at from 1000° C. to 1500° C. (inclusive) is less than 1.2 times the thermal conductivity at from 20° C. to 1000° C. (inclusive). Thus, it is confirmed that the increase in thermal conductivity with increasing temperature is controlled more.

On the other hand, one as in Comparative Example 11 has a lower porosity, worse insulation properties, is vulnerable, and tends to break when handling. Further, in Comparative Example 12, the percentage of the pores having a large diameter is large, the thermal conductivity at from 1000° C. to 1500° C. (inclusive) exceeds 1.5 times the thermal conductivity at from 20° C. to 1000° C. (inclusive), and it has very poor high-temperature insulation properties.

What is claimed is:

1. A heat-insulating material formed of a spinel porous sintered body having a porosity of from 65 vol. % to 90 vol. % and represented by a chemical formula $XAl_2O_4$, wherein
    X in said chemical formula is selected from the group consisting of Zn, Fe, Mg, Ni, and Mn,
    large pores having a pore diameter of greater than 1000 μm occupy 25 vol. % or less of the total volume of pores in the heat-insulating material,
    fine pores having a pore diameter of 0.45 μm or less occupy 5 vol. % to 40 vol. % of the volume of the pores having a pore diameter of 1000 μm or less,
    at least one pore-diameter distribution peak is within a pore diameter range of from 0.14 μm to 10 μm, and
    a calculated average particle diameter of sintered particles is from 0.04 μm to 1 μm.

2. A heat-insulating material as claimed in claim 1, wherein at least one pore-diameter distribution peak is within a pore-diameter range of 0.14 μm to less than 0.45 μm, and at least one pore-diameter distribution peak is within a pore-diameter range of from 0.45 μm to 10 μm.

3. A heat-insulating material as claimed in claim 1, wherein at least one pore-diameter distribution peak is within a pore-diameter range of greater than 10 μm to 1000 μm or less.

4. A heat-insulating material as claimed in claim 2, wherein at least one pore-diameter distribution peak is within a pore-diameter range of greater than 10 μm to 1000 μm or less.

5. A heat-insulating material formed of a porous sintered body made of $MgAl_2O_4$ and having a porosity of 73 vol. % or more, wherein
    the pores having a pore-diameter of 0.8 μm to less than 10 μm occupy 60 vol. % to less than 80 vol. % of the total volume of pores in the heat-insulating material,
    the pores having a pore-diameter of 0.01 μm or more and less than 0.8 μm occupy 10 vol. % to less than 30 vol. % of the total volume of pores in the heat-insulating material, and
    thermal conductivity of the heat-insulating material at from 1000° C. to 1500° C. does not exceed 1.5 times the thermal conductivity at from 20° C. to 1000° C.

6. A heat-insulating material as claimed in claim 5, wherein the thermal conductivity at from 1000° C. to 1500° C. is 0.3 W/m·K or less.

7. A heat-insulating material as claimed in claim 5, wherein the thermal conductivity at from 1000° C. to 1500° C. is 0.26 W/m·K or less.

8. A heat-insulating material as claimed in claim 6, wherein the thermal conductivity at from 1000° C. to 1500° C. does not exceed 1.2 times the thermal conductivity at from 20° C. to 1000° C.

9. A heat-insulating material as claimed in claim 7, wherein the thermal conductivity at from 1000° C. to 1500° C. does not exceed 1.2 times the thermal conductivity at from 20° C. to 1000° C.

10. A heat-insulating material as claimed in claim 5, wherein volumetric specific heat of the heat-insulating material is 1.2 $J/cm^3·K$ or less.

11. A heat-insulating material as claimed in claim 6, wherein volumetric specific heat of the heat-insulating material is 1.2 $J/cm^3·K$ or less.

12. A heat-insulating material as claimed in claim 7, wherein volumetric specific heat of the heat-insulating material is 1.2 $J/cm^3·K$ or less.

13. A heat-insulating material as claimed in claim 8, wherein volumetric specific heat of the heat-insulating material is 1.2 $J/cm^3·K$ or less.

14. A heat-insulating material as claimed in claim 9, wherein volumetric specific heat of the heat-insulating material is 1.2 $J/cm^3·K$ or less.

* * * * *